US010712964B2

(12) United States Patent
Mritunjai

(10) Patent No.: US 10,712,964 B2
(45) Date of Patent: Jul. 14, 2020

(54) PRE-FORKING REPLICAS FOR EFFICIENT SCALING OF A DISTRIBUTED DATA STORAGE SYSTEM

(71) Applicant: Amazon Technologies, Inc., Seattle, WA (US)

(72) Inventor: Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 15/988,714

(22) Filed: May 24, 2018

(65) Prior Publication Data
US 2018/0267735 A1 Sep. 20, 2018

Related U.S. Application Data

(63) Continuation of application No. 15/374,520, filed on Dec. 9, 2016, now Pat. No. 9,983,823.

(51) Int. Cl.
G06F 3/06 (2006.01)
G06F 12/00 (2006.01)

(52) U.S. Cl.
CPC .......... *G06F 3/0644* (2013.01); *G06F 3/0604* (2013.01); *G06F 3/065* (2013.01); *G06F 3/0631* (2013.01); *G06F 3/0683* (2013.01)

(58) Field of Classification Search
CPC ...... G06F 3/0644; G06F 3/0631; G06F 3/065; G06F 3/0683; G06F 12/00; G06F 13/00
(Continued)

(56) References Cited

U.S. PATENT DOCUMENTS 7,484,091 B2  1/2009  Bade et al.
7,996,836 B1  8/2011  McCorkendale et al.
(Continued)

FOREIGN PATENT DOCUMENTS

CN   102377786    3/2012
CN   103714050    4/2014
WO   2012102863   8/2012

OTHER PUBLICATIONS

CloudEndure, "Simple Migration to the Cloud with No Downtime," 2014 copyright, downloaded from https://www.cloudendure.com/cloudmigrationproduct/ on Sep. 30, 2015, pp. 1-10.
(Continued)

*Primary Examiner* — Tuan V Thai
(74) *Attorney, Agent, or Firm* — Robert C. Kowert; Kowert, Hood, Munyon, Rankin & Goetzel, P.C.

(57) ABSTRACT

A leader replica of a replica host group of a distributed storage service is configured to replicate the leader replica and its associated one or more secondary replicas to create a duplicate host group comprising a duplicate leader replica and one or more duplicate secondary replicas. The leader replica may appoint the duplicate leader replica or another host as the leader of the duplicate host group. The leader replica may assign a subset of database keys to be served by the duplicate host group and forward data requests directed a key of the subset of keys assigned to the duplicate host group. The leader replica may further update a global key table of the distributed data storage system to direct data requests associated with the subset of database keys to the duplicate leader replica.

20 Claims, 11 Drawing Sheets

(58) Field of Classification Search
USPC .......................................... 711/100, 155, 156
See application file for complete search history.

(56) References Cited

U.S. PATENT DOCUMENTS

| | | | |
|---|---|---|---|
| 8,032,899 | B2 | 10/2011 | Archer et al. |
| 8,127,292 | B1 | 2/2012 | Dobrovolskiy et al. |
| 8,201,161 | B2 | 6/2012 | Challener et al. |
| 8,239,557 | B2 | 8/2012 | McCune et al. |
| 8,392,482 | B1 | 3/2013 | McAlister et al. |
| 8,433,802 | B2 | 4/2013 | Head et al. |
| 8,514,868 | B2 | 8/2013 | Hill |
| 9,361,145 | B1 | 6/2016 | Wilson et al. |
| 9,569,513 | B1* | 2/2017 | Vig .......................... G06F 16/27 |
| 9,983,823 | B1 | 5/2018 | Mritunjai |
| 10,152,497 | B2* | 12/2018 | Doan ..................... G06F 16/215 |
| 2005/0251806 | A1 | 11/2005 | Auslander et al. |
| 2006/0146731 | A1 | 7/2006 | Lewis et al. |
| 2007/0005746 | A1 | 1/2007 | Roe et al. |
| 2008/0082555 | A1* | 4/2008 | Salmon ............... H04L 67/1095 |
| 2008/0244553 | A1 | 10/2008 | Cromer et al. |
| 2010/0070970 | A1 | 3/2010 | Hu et al. |
| 2014/0244300 | A1* | 8/2014 | Bess ........................ G06F 16/22 705/3 |
| 2016/0267157 | A1* | 9/2016 | Mutschler ............. G06F 16/258 |

OTHER PUBLICATIONS

Racemi Business Systems Agility, "Cloud Migration Software—Server Migration Software," Racemi 2015, downloaded from http://www.racemi.com/ on Sep. 30, 2015, pp. 1-2.

ScienceLogic, Inc. 2015, "The ScienceLogic Platform—Complete Hybrid IT Monitoring," downloaded from https://www.sciencelogic.com/product on Sep. 30, 2015, pp. 1-14.

RISC Networks (2015), "CloudScape", downloaded from http://www.riscnetworks.com/cloudscape/ on Sep. 30, 2015, pp. 1-13.

U.S. Appl. No. 15/189,983, filed Jun. 22, 2016, Hariharan Subramanian et al.

U.S. Appl. No. 15/199,489, filed Jun. 30, 2016, Anthony Nicholas Liguori et al.

Zsgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994—Feb. 13, 2004, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253—Jan. 10, 2009, pp. 1-11.

Robbert van Renesse, et al, "Chain Replication for Supporting High Throughput and Availability," USENIX Association, "OSDI 2004: 6th Symposium on Operating Systems Design and Implementation," pp. 91-104.

Philip A. Bernstein, et al, "Concurrency Control and Recovery in Database Systems," Addison-Wesley Publication Company, ISBN 0-201-10715-5, 1987, pp. 1-58.

From Wikipedia, the free encyclopedia, "Bromium," downloaded on Jun. 27, 2016 from https://en.wikipedia.org/wiki/Bromium, pp. 1-4.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: vol. 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

From Wikipedia, the free encyclopedia, "Xen," downloaded from Jun. 6, 2016 from https://en.wikipedia.org/wiki/Xen, pp. 1-12.

* cited by examiner

PRE-FORKING REPLICAS FOR EFFICIENT SCALING OF A DISTRIBUTED DATA STORAGE SYSTEM

This application is a continuation of U.S. patent application Ser. No. 15/374,520, filed Dec. 9, 2016, now U.S. Pat. No. 9,983,823, which is hereby incorporated by reference herein in its entirety.

BACKGROUND

In some existing provider networks, dynamic resource partitions, for example to allow for additional storage or input/output ("I/O") resources for a client's application(s), are implemented in order to scale the platform resources in response to demands. A partitioning process may include duplicating one or more host groups. When partitioning, some existing systems require duplication of one or more replica hosts and election of a new leader replica—for example by a consensus algorithm—among the duplicates. This election process uses additional system resources and may cause a noticeable slowdown in performance of various aspects of the system. A lower-overhead solution to replicating replica hosts groups during partitioning is desirable.

Figure 1:
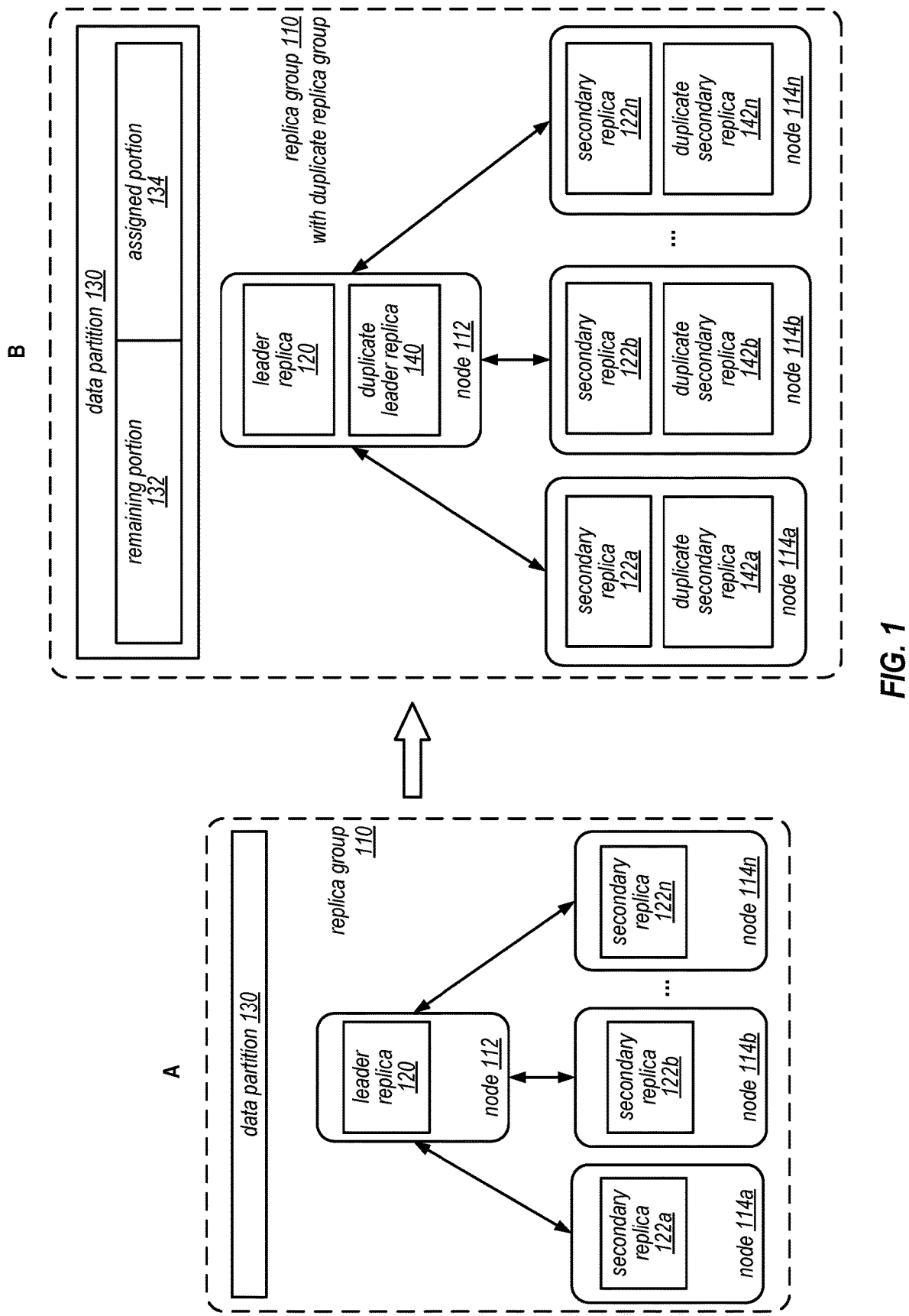
FIG. 1 is a block diagram illustrating one embodiment of an implementation of pre-forking replicas before a partition according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The systems and methods described herein may be employed in various combinations and in various embodiments to implement a Web-based service that provides computing or other services to clients, for example database services to database service clients (e.g., user, subscribers, or client applications that access the database service on behalf of users or subscribers). Such systems may provide a high level of durability and availability through replication and automated failover. As described in more detail herein, the database services may employ "pre-forking" of replicas and appointment of replica group leaders as described herein.

Several leading technology organizations are investing in building technologies that sell "software-as-a-service". Such services include providing access to distributed, shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. Interaction between client applications and database servers typically includes read operations (read-only queries), write operations (to store data), and update operations that can be conceptualized using a read-modify-write workflow.

Distributed data storage systems typically include groups or clusters of replica hosts that store copies of fragments (or "shards") of data stored in the distributed data storage system. A host group may typically include a "leader" replica host that is responsible for data integrity and synchronization of the group and one or more associated secondary (also called "secondary") hosts. In some embodiments, only a leader host may handle a write request, while a secondary or leader host may process a read request. In some embodiments, a "strongly consistent" read request may be made, which would require handling by a leader of the appropriate replica group because only the leader node is guaranteed at any particular moment to have the most up-to-date data.

In some embodiments, the database services described herein may store data on behalf of clients in multiple replicas on respective computing nodes in different availability zones. These services may employ a lease based protocol to select a leader replica for a replica group that does not depend on an external service or manager, but that is managed by client processes executing on the database hosts themselves by writing to and reading from tables in a consistent data store (e.g., one that achieves read-after-write consistency) to which they all have access.

In one example, to assume the role of a primary (writable) leader for a database table, a leader replica may acquire a lease by updating a lease record for the table that is maintained in a consistent data store. If the primary leader replica fails to renew the lease within a pre-determined lease period (which may be the same as the heartbeat period for the primary leader replica), it may revert to read-only mode, and a secondary leader replica, having determining (based on the information in the lease record) that the primary leader no longer holds the lease, may assume the role of primary leader by acquiring the lease and making itself writable. The leader failover protocol may be performed automatically (e.g., without human intervention or initiation) in response to the failure of a primary leader or its inability to renew its lease, in some embodiments. In other embodiments, the leader failover protocol may be performed semi-automatically, e.g., requiring the intervention of a technician to ensure that only one leader node is writable at a time.

In various embodiments, a data storage service may be implemented on one or more computing nodes that are configured to perform the functionality described herein. In some embodiments, the service may be implemented by a provider network (such as provider network 440 in FIG. 4) that is made up of multiple computing nodes, each of which may perform one or more of the functions described herein. Various collections of the computing nodes may be configured to provide the functionality of a cluster of resources dedicated to the database service, and/or a collection of resources that may be shared between multiple Web services or applications, in some embodiments. In some embodiments, an external workflow component may be used to perform distributed operations, such as those that extend beyond a particular partition replication group. As noted above, in various embodiments, the database systems described herein may store data in replicated partitions on multiple compute or nodes (which may be located in multiple data centers) and may implement a lease base leader failover protocol.

In some embodiments, the database systems described herein may be deployed across multiple "availability zones", each of which may include its own physically distinct, independent infrastructure on which a collection of computing nodes (e.g., computing nodes on which storage system server nodes and/or database engine head nodes are implemented). In some embodiments, each availability zone may reside in a different location or region, while in other embodiments multiple availability zones may reside in the same location or region. In some embodiments, the database systems may provision primary resource instance capacity for a given database in one availability zone (e.g., enough resource instance capacity to implement a database engine head node and one or more storage system server nodes, along with corresponding storage devices), and may provision additional resource instance capacity for the given database in another availability zone (e.g., enough resource instance capacity to implement one or more redundant storage system server nodes, along with corresponding storage devices storing replicas of the data stored in the primary availability zone).

In some embodiments, the database services described herein may store multiple replicas split across multiple availability zones. Each availability zone in the topology may contain a full slaving tree that includes a leader replica and multiple read-only secondary replicas that receive data through synchronous or asynchronous replication, in different embodiments. The leader replicas may also replicate data to each other using synchronous or asynchronous replication, in different embodiments. One of the leader replicas may be designated as the primary leader replica by setting a parameter of its database instance to allow writes to the database, and the secondary leader replica in the other zone may only become writable after a failover. In some embodiments, an extra candidate leader may also exist in each availability zone. This extra candidate leader may act as a read-only secondary until and unless a primary or secondary leader needs to be replaced. In some embodiments, processes that make mutating database changes may poll all the leader replicas to identify the particular database that is currently writable. Note that only a single leader can be in a writable state at any given point in time in order to prevent data inconsistencies and collisions.

FIG. 1 is a block diagram illustrating one embodiment of an implementation of pre-forking replicas before a partition according to some embodiments. It is noted that, in this and other ones of the drawings, where one or more instances of a given component may exist, reference to that component herein below may be made in either the singular or the plural. However, usage of either form is not intended to preclude the other. In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a distributed system including a number of computing nodes (or simply, nodes), such as the computer node embodiment illustrated in FIG. 11 and discussed below. In various embodiments, the functionality of a given database service system component, storage component, or storage service component may be implemented by a particular computing node or may be distributed across several computing nodes. In some embodiments, a given computing node may implement the functionality of more than one component.

Pre-forking functionality may be implemented in various embodiments according to guidelines established by a system designer or, for example, in accordance with service level agreement requirements. For example, according to some embodiments, each host group may pre-fork itself once as a matter of course, for all system resources or for resources associated with a particular service level. In other embodiments, pre-forking may be used only where a system expects partitioning to occur, for example by reaching a threshold of resource usage, particularly I/O or storage usage, or as another example by machine learning processes configured to detect likelihood of partitioning. One having ordinary skill in the art will appreciate that although the descriptions and drawings herein primarily refer to 1:2 preforking splits, a host group may split itself in other ratios, for example by creating additional duplicates and assigning more than two subsets of an original keyspace or data partition during a pre-forking procedure.

At phase A of FIG. 1, a replica group 110 includes a leader replica 120 at node 112 and one or more secondary replicas 122a-122n at nodes 114a-114n, collectively forming a replica group (also called a host group). As described above, each replica may store a replica of a data shard of the distributed data storage service. A leader replica, for example leader replica 120, maintains control of updates to the data of the particular data shard or fragment associated with the host group, according to some embodiments.

As described elsewhere herein and as will be apparent to one having ordinary skill in the art, a leader replica such as leader replica 120 may be responsible for maintaining data integrity and synchronization between all replicas or hosts in a host group. Additionally, a leader replica may be associated with a data partition 130 representing all database keys of a distributed data storage system for which the host group of leader replica 120 is responsible for serving.

At phase B of FIG. 1, pre-forking replica hosts includes creating a duplicate leader replica 140 at node 112 and one or more duplicate secondary replicas 142a-142n on nodes 114a-114n, where the secondary replicas are associated with duplicate leader replica 140. According to some embodiments, duplicate leader replica 140 may be a copy of leader replica 120 and stored, at least initially, at the same node 112 as leader replica 120. According to some embodiments, one or all of secondary replicas 122a-122n associated with leader replica 120 may be replicated as duplicate secondary replicas 142a-142n as shown at phase B of FIG. 1.

Figure 3:
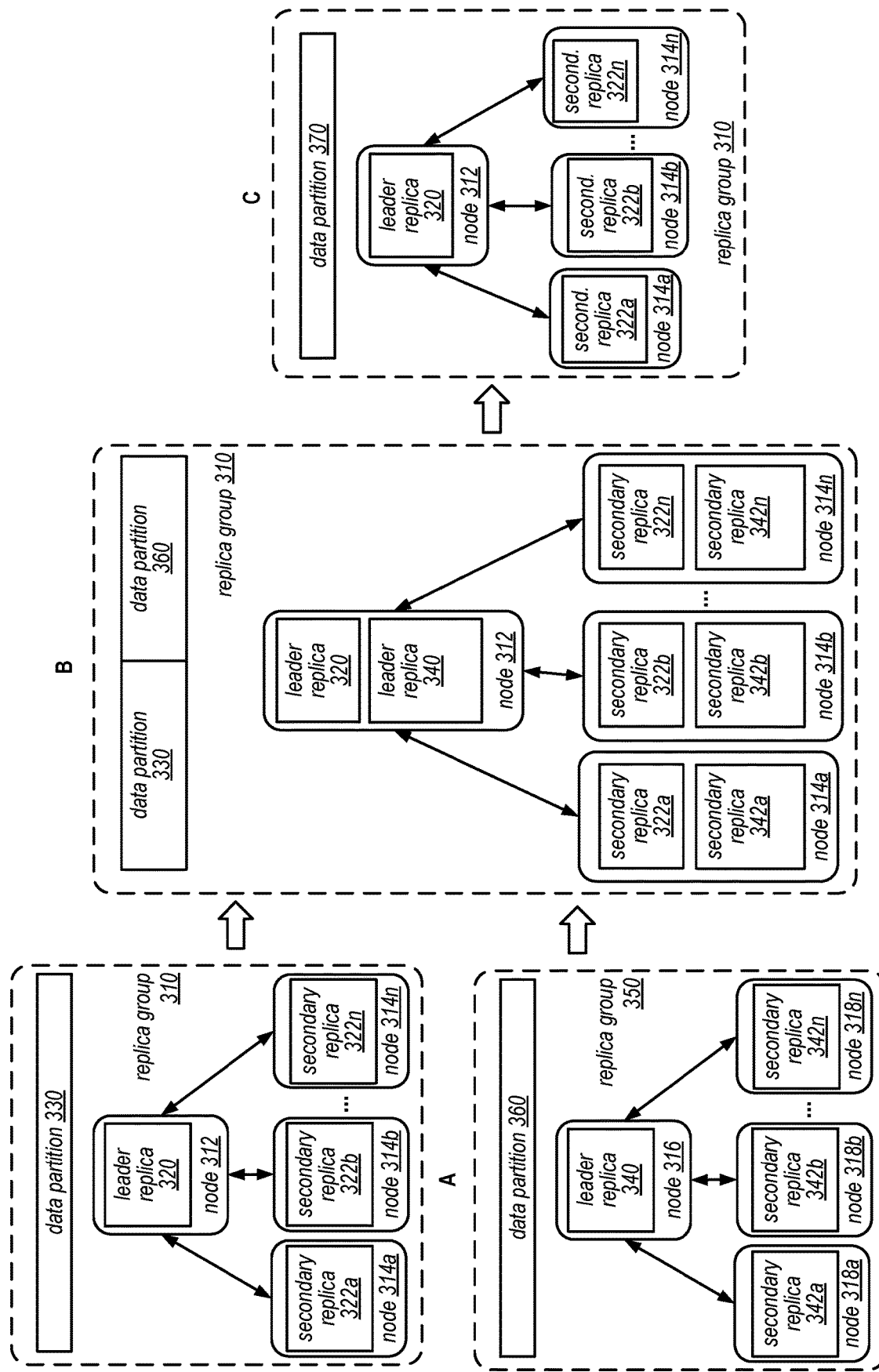
FIG. 3 is a block diagram illustrating merging two partitions according to some embodiments.

Also at phase B of FIG. 1, leader replica 120 may assign a subset of data partition 130 (assigned portion 134) to be served by duplicate leader replica 140 and duplicate secondary replicas 142a-142n associated with duplicate leader replica 140. For example, according to some embodiments, a portion of the original data partition 130 (remaining portion 132) according to the example embodiment of FIG. 3 is still served by leader replica 120, while the assigned portion 134 may be assigned to be served by duplicate leader replica 140 and its associated host group.

Initally, a division of keyspace assignment as shown at phase B of FIG. 1, according to some embodiments, may occur only at the node and may be invisible to other resources such as a control plane or partition manager, other system-level resources, or other nodes. For example, a system-level keyspace table according to some embodiments may still correspond with the information of original data partition 130, such that any requests associated with keys of original data partition 130 are to be directed to leader replica 120 just as before the pre-forking processes began. In such an embodiment, leader replica 120 may be responsible for identifying requests directed to keys that have been assigned to duplicate leader replica 140 (such as keys of assigned portion) and forwarding such requests to duplicate leader replica 140 for service.

Figure 2:
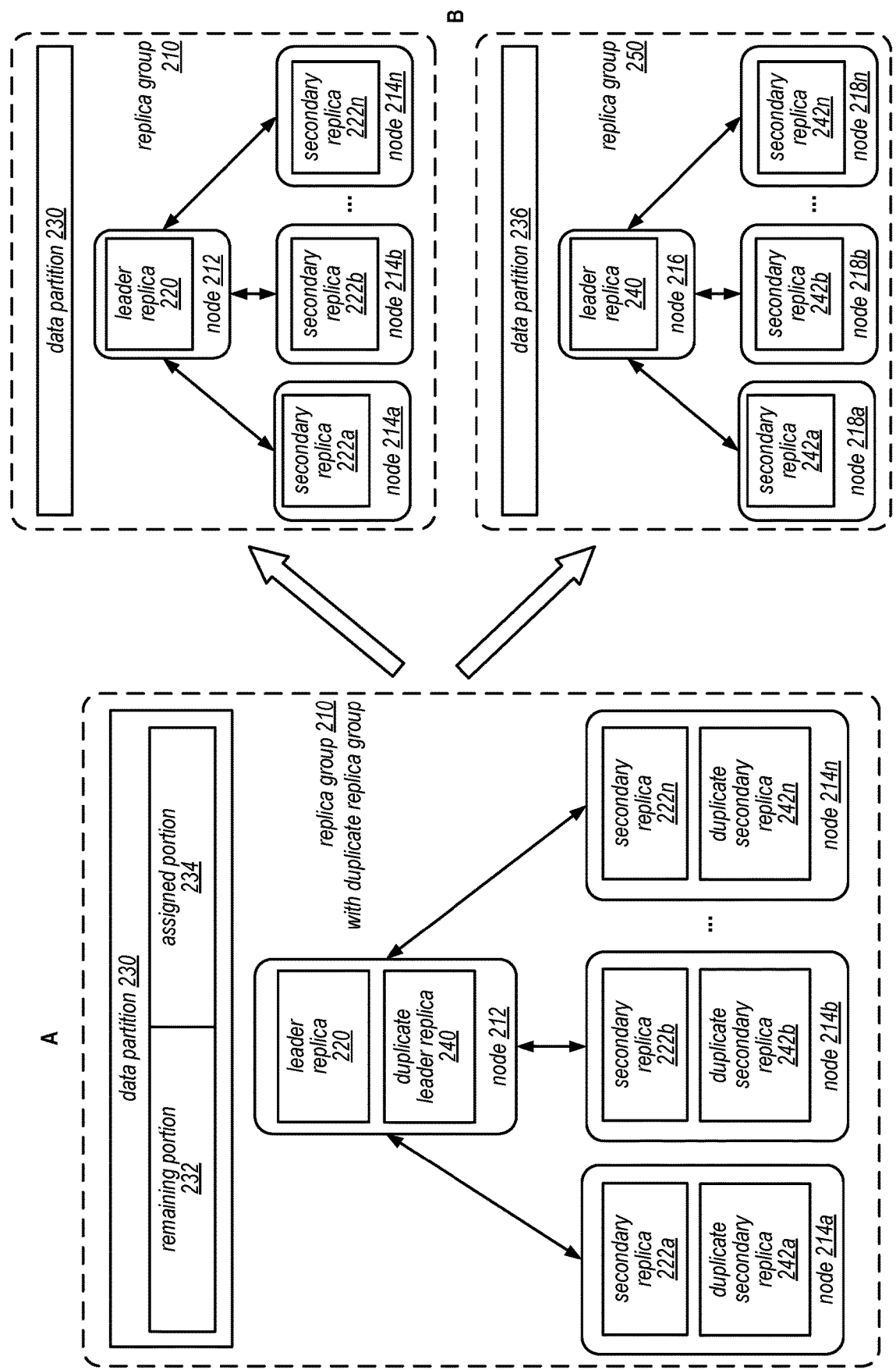
FIG. 2 is a block diagram illustrating an example embodiment of completing a partition of a pre-forked replica group according to some embodiments.

FIG. 2 is a block diagram illustrating an example embodiment of completing a partition of a node including pre-forked replicas according to some embodiments. At phase A of FIG. 2, a replica group 210 may be considered most similar in state to replica group 110 at phase B of FIG. 1. Replica group 210 at phase A includes a leader replica 220 at node 212 and one or more secondary replicas 222a-222n at nodes 214a-214n. Replica group 210 at phase A may additionally include a duplicate leader replica 240 collocated at node 212 with leader replica 220 and one or more duplicate secondary replicas 242a-242n collocated on nodes with original pre-fork secondary replicas.

Example replica group 210 at phase A includes a keyspace split into remaining portion 232 and assigned portion 234. Remaining portion includes the keys served by leader replica 220, while assigned portion includes the keys served by duplicate leader replica 240.

At phase B of FIG. 2, a partition of the distributed data storage system is performed. In some embodiments, Leader replica 220 and its one or more associated secondary replicas 222a-222n may remain on replica group 210. In other embodiments, leader replica 220 and its one or more associated secondary replicas 222a-222n may be moved to a separate node (not shown in the example of FIG. 2).

Replica group 210 at phase B of FIG. 2 includes a data partition 230. Data partition 230 may be identical to remaining portion 232 according to some embodiments. In other embodiments, data partition 230 may include additional or different keys from remaining portion 232 as shown at phase A of FIG. 2.

In some embodiments, duplicate leader replica 240 and its one or more associated duplicate secondary replicas 242a-242n may have been moved to a replica group 250 at phase B of FIG. 2. According to some embodiments, duplicate leader replica 240 after partitioning may reside on its own node 216 while its associated secondary replicas 242a-242c reside on nodes 218a-218n. Nodes 216 and 218a-218n according to some embodiments may be a new node created in response to the partitioning. In other embodiments, replica group 250 may represent a preexisting node, for example a node whose resources were underutilized before partitioning.

Replica group 250 at phase B of FIG. 2 includes a data partition 236. Data partition 236 may be identical to assigned portion 234 according to some embodiments. In other embodiments, data partition 236 may include additional or different keys from those of assigned portion 234 as shown at phase A of FIG. 2.

FIG. 3 is a block diagram illustrating merging two nodes according to some embodiments. According to some embodiments, merging may occur when available resources are expected to be surplus to requirements (e.g. no pre-forking or partitioning is imminently expected). In some embodiments the timing of merging, partitioning, and pre-forking events may be controlled by any combination of service level requirements; past resource usages, for example during particular tasks, times of day, or day of the week; machine learning algorithms; future projections of resource requirements; system user or customer preferences or data; or other system design parameters.

At phase A of FIG. 3, two separate nodes 310 and 350 are shown before merging. Replica group 310 includes leader replica 320 at node 312 and one or more secondary replicas 322a-322n at nodes 314a-314n and associated with leader replica 320, collectively forming a host group, similarly as shown at FIG. 1 and described in detail with reference to leader replica 120 and its one or more associated secondary replicas 122a-122n. Replica group 310 according to some embodiments additionally includes a data partition 330 storing database keys that are served by the host group of leader replica 320.

Also at phase A of FIG. 3, replica group 350 includes a leader replica 340 at node 316 and one or more secondary replicas 342a-342n at nodes 318a-318n and associated with leader replica 340, collectively forming a host group, similarly as shown at FIG. 1 and described in detail with reference to duplicate leader replica 120 and its one or more associated secondary replicas 122a-122n. Replica group 350 according to some embodiments additionally includes a data partition 360 storing database keys that are served by the host group of leader replica 340.

At phase B of the example embodiment of FIG. 3, leader replica 340, previously of replica group 350, has been copied or moved to node 312 of replica group 310, where the leader replica 320 also continues to reside. During phase B, according to some embodiments, data partitions 330 and 360 may remain separate and served by leader replica 320 and leader replica 340, respectively.

Also at phase B, secondary replicas 342a-342n, previously of replica group 350, have been copied or moved to nodes 314a-314n of replica group 310, where secondary replicas 322a-322n also continue to reside. During phase B, according to some embodiments, data partitions 330 and 360 may remain separate and served for read requests by secondary replicas 322a-322n and 342a-342n, respectively.

At phase C of the example embodiment of FIG. 3, leader replica 320 has been appointed to lead all other replica hosts at replica group 310, and replica 340 has effectively been removed, for example by merging metadata and deleting data of the replica. In other embodiments (not shown at FIG. 3), replica 340 may yielded or fail over to leader replica 320, for example becoming a secondary replica to leader replica 320. In other embodiments, leader replica 340 may be deleted or otherwise deactivated from the distributed data storage system. A similar process is applied at nodes 314a-314n with respect to the secondary nodes. According to some embodiments, data partition 370 of replica group 310 may represent the combined keyspace of data partitions 330 and 360 of phase B of FIG. 3, or may represent additional or different keyspace according to specific system requirements.

The identity of the leader replica of the replica group 310 after merging or combining with hosts previously of replica group 350 may be decided by a predetermined static rule—for example, the existing leader of the node onto which other hosts are moved (in this case replica group 310) may automatically become the leader. In other systems, other rules may be implemented according to system design and preferences. For example, a consensus election may be implemented to determine a new leader from among all hosts present at replica group 310 after merging, or a similar election may occur only between hosts that were leaders of their own groups immediately before merging. One having ordinary skill in the art will note that although FIG. 3 shows only two host groups merging, in other embodiments, any number of hosts or host groups may merge onto a node simultaneously or in short succession.

After phase C of FIG. 3, leader replica 320 may move or destroy one or more secondary replicas that are surplus to system requirements, for example by implementing standard local database transactions (not shown).

Figure 4:
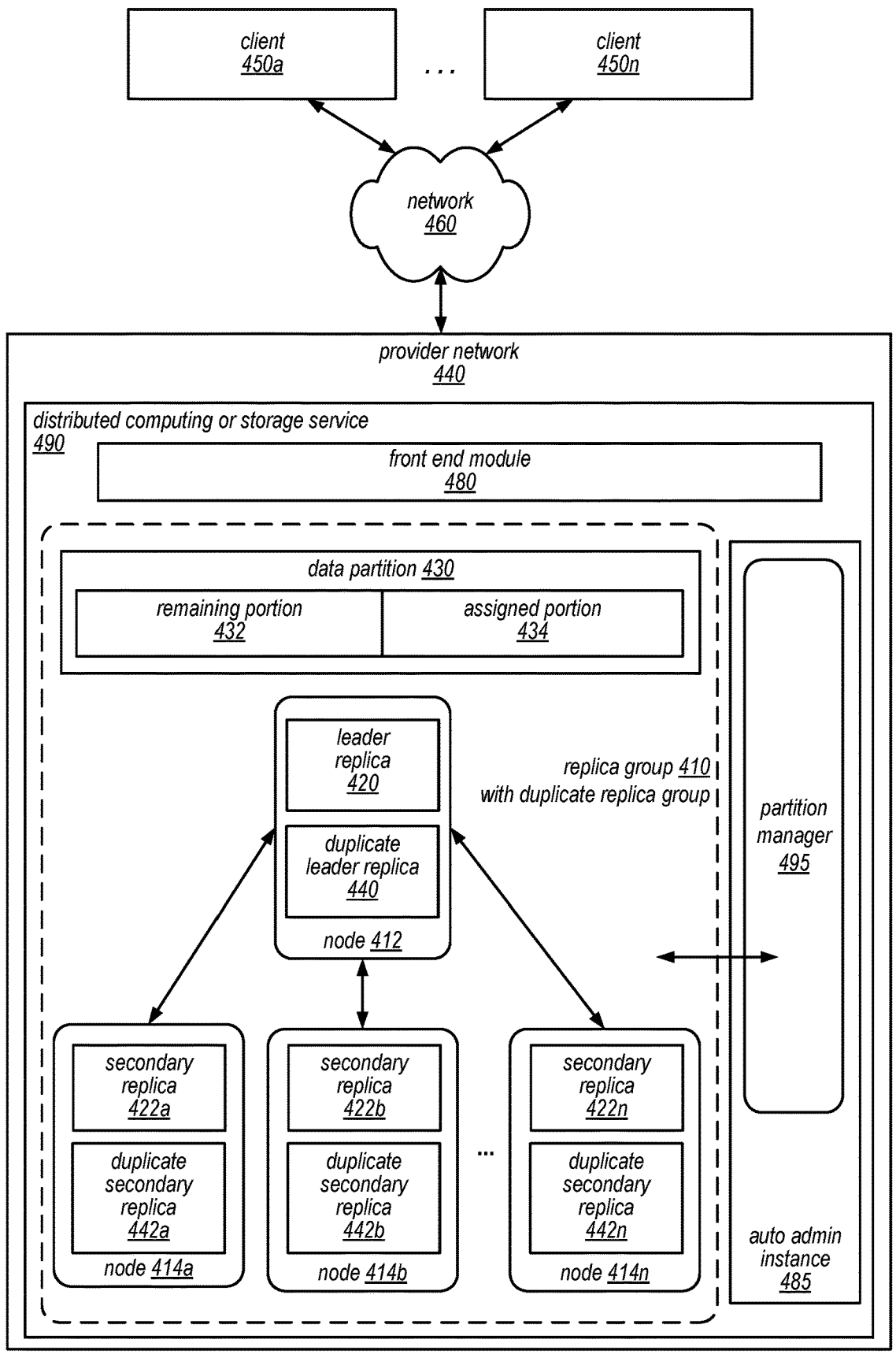
FIG. 4 is a block diagram illustrating one embodiment of a system architecture that is configured to implement a provider network including a distributed data storage system that implements pre-forking replicas according to some embodiments.

FIG. 4 is a block diagram illustrating one embodiment of a system architecture that is configured to implement a provider network 440 including a distributed data storage system that implements pre-forking replicas according to some embodiments. In the illustrated embodiment, a number of clients (shown as clients 450a-450n) may be configured to interact with a provider network 440 via a network 460. The provider network 440 may be configured to interface with distributed computing or storage service 490, including one or more front end modules 480, one or more automatic administration instances 485, and/or various other services or applications.

A partition manager 495 or other control module of a distributed storage service such as a control plane (not shown at FIG. 4) may, according to some embodiments, detect conditions for partition and manage administrative aspects of partitioning. For example, in various embodiments, a partition manager 495 may be responsible for separating duplicate leader replica 440 and its associated duplicate secondary replicas 442a-442n onto a separate nodes from leader replica 420 at node 412 and its associated secondary replicas 422a-422n at nodes 414a-414n, similar to the process illustrated at FIG. 2 and described above.

In various embodiments, the components illustrated in FIG. 4 may be implemented directly within computer hardware, as instructions directly or indirectly executable by computer hardware (e.g., a microprocessor, a computer system, or one or more hardware processors), or using a combination of these techniques. For example, the components of FIG. 4 may be implemented by a distributed system including a number of computing nodes (or simply, nodes), such as the computer system embodiment shown in FIG. 11 and discussed below. In various embodiments, the functionality of a given service system component (e.g., a storage service system component) may be implemented by a particular node or distributed across several nodes. In some embodiments, a given node may implement the functionality of more than one service system component (e.g., more than one storage service system component).

In general, clients 450a-n may be agnostic or unaware of provider network 440's capability to pre-fork replicas. In some embodiments, the clients 450a-n may encompass any type of client configurable to submit requests to the provider network 440 via the network 460, including requests for data transfer or storage services. For example, a given client 450a may include a suitable version of a web browser, or a plugin module or other type of code module configured to execute as an extension to or within an execution environment provided by a web browser. Alternatively, a client 450 (e.g. a node) may encompass an application such as a database application, media application, office application or any other application that may make use of data transfer resources. In some embodiments, such an application may include sufficient protocol support (e.g., for a suitable version of Hypertext Transfer Protocol (HTTP)) for generating and processing web services requests without necessarily implementing full browser support for all types of web-based data. That is, the client 450 may be an application configured to interact directly with the provider network 440. A client 450 may be configured to generate web services requests according to a Representational State Transfer (REST)-style web services architecture, a document- or message-based web services architecture, or another suitable web services architecture.

In other embodiments, a client 450 may be configured to provide access to pre-forking services in a manner that is transparent to those applications. For example, the client 450 and provider network 440 may be configured to agree and implement a service level that include pre-forking replicas.

Clients 450a-n may convey service or operational requests to and receive responses from the provider network 440 via the network 460. In various embodiments, the network 460 may encompass any suitable combination of networking hardware and protocols necessary to establish web-based communications between the clients 450a-n and the provider network 440. For example, the network 460 may generally encompass the various telecommunications networks and service providers that collectively implement the Internet. The network 460 may also include private networks such as local area networks (LANs) or wide area networks (WANs) as well as public or private wireless networks. For example, both a given client 450a and the provider network 440 may be respectively provisioned within enterprises having their own internal networks. In such an embodiment, the network 460 may include the hardware (e.g., modems, routers, switches, load balancers, proxy servers, etc.) and software (e.g., protocol stacks, accounting software, firewall/security software, etc.) necessary to establish a networking link between given client 450a and the Internet as well as between the Internet and the provider network 440. It is noted that in some embodiments, the clients 450a-n may communicate with the provider network 440 using a private network rather than the public Internet. For example, the clients 450a-n may be provisioned within the same enterprise as a storage service system (e.g., a system that implements the data store 260). In such a case, the clients 450a-n may communicate with the provider network 440 entirely through a private network (e.g., a LAN or WAN that may use Internet-based communication protocols but which is not publicly accessible).

Generally speaking, the provider network 440 may be configured to implement one or more service endpoints configured to receive and process web services requests, such as requests to encode data or requests to decode data. For example, the provider network 440 may include hardware and/or software configured to implement a particular endpoint, such that an HTTP-based web services request directed to that endpoint is properly received and processed. In one embodiment, the provider network 440 may be implemented as a server system configured to receive web services requests from the clients 450a-n and to forward them to appropriate components or clients of the service. In other embodiments, the provider network 440 may be configured as a number of distinct systems (e.g., in a cluster topology) implementing load balancing and other request management features configured to dynamically manage large-scale web services request processing loads. In various embodiments, the provider network 440 may be configured to support REST-style or document-based (e.g., SOAP-based) types of web services requests.

In addition to functioning as an addressable endpoint for clients' web services requests, in some embodiments, the web services or provider network 440 may implement various client management features. For example, provider network 440 may coordinate the metering and accounting of client usage of web services, including storage resources, such as by tracking the identities of requesting clients 450a-n, the number and/or frequency of client requests, the size of objects stored or retrieved on behalf of clients 450a-n, overall storage bandwidth used by clients 450a-n, class of storage requested by clients 450a-n, or any other measurable client usage parameter. The provider network 440 may also implement financial accounting and billing systems, or may maintain a database of usage data that may be queried and processed by external systems for reporting and billing of client usage activity. In certain embodiments, the provider network 440 may be configured to collect, monitor and/or aggregate a variety of storage service system operational metrics, such as metrics reflecting the rates and types of requests received from the clients 450a-n, bandwidth utilized by such requests, system processing latency for such requests, system component utilization (e.g., network bandwidth and/or storage utilization within the storage service system), rates and types of errors resulting from requests, characteristics of requested objects (e.g., size, data type, etc.), or any other suitable metrics. In some embodiments such metrics may be used by system administrators to tune and maintain system components, while in other embodiments such metrics (or relevant portions of such metrics) may be exposed to the clients 450a-n to enable such clients to monitor data transfer requests, distributed computing or storage service(s) 490, and/or another provider network 440 (or the underlying systems that implement those services).

Note that while several examples included herein describe a network or service exposed to external clients, in other embodiments, the storage service may be internal to a computing system or an enterprise system and may not be exposed to external clients (e.g., users or client applications). For example, the operating system, a backup process, or another system component may back up a primary storage system (e.g., periodically, automatically or in response to a request to do so) to a separate storage system by transferring data to the backup system in erasure-coded form. In these examples, the "client" of the system may be another application internal to a virtual computing service.

Replica group 410 of distributed computing or storage service 490 is shown as a pre-forked replica group and may include a leader replica 420 at node 412 and one or more secondary replicas 422a-422n at nodes 414a-414n, similarly as described with respect to FIG. 1. Replica group 410 may additionally include a data partition 430 including remaining portion 432 assigned to an original replica group and assigned portion 434 assigned to a duplicate replica group. After pre-forking replicas of replica group 410, replica group 410 may additionally include a duplicate leader replica 440 and one or more duplicate secondary replicas 442a-442n, similarly as described with reference to FIG. 1.

Figure 5A:
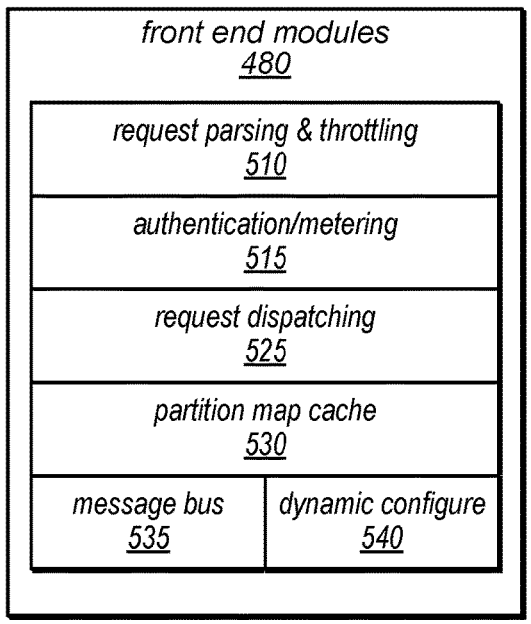
FIG. 5A-5C are block diagrams illustrating various components of a provider network, according to some embodiments.
Figure 5B:
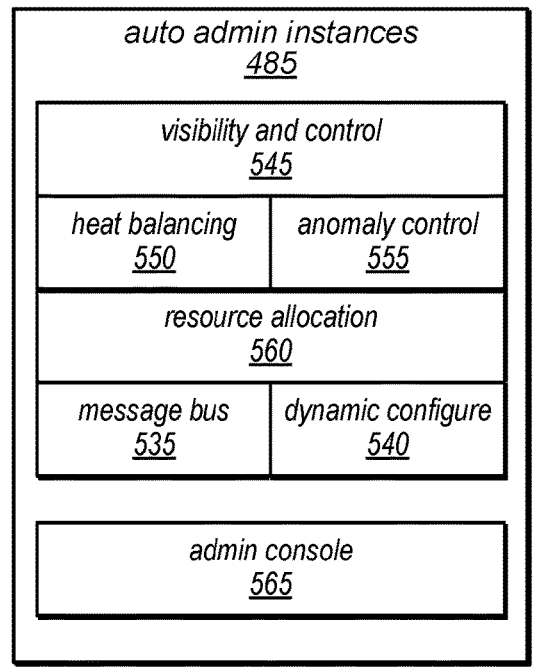
Figure 5C:
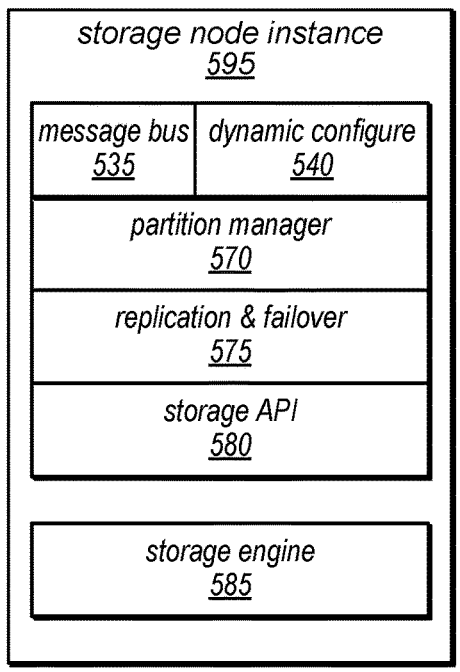

FIGS. 5A-5C illustrate various elements or modules that may be included in each of the types of components of Web services platform 130, according to one embodiment. As illustrated in FIG. 5A, front end module 480 may include one or more modules configured to perform parsing and/or throttling of service requests (shown as 510), authentication and/or metering of service requests (shown as 515), dispatching service requests (shown as 525), and/or maintaining a partition map cache (shown as 530). In addition to these component-specific modules, front end module 480 may include components that are common to multiple types of computing nodes that collectively implement Web services platform 130, such as a message bus (shown as 535) and/or a dynamic configuration module (shown as 540). In other embodiments, more, fewer, or different elements may be included in front end module 480, or any of the elements illustrated as being included in front end module 480 may be included in another component of Web services platform 130 or in a component configured to interact with Web services platform 130 to provide the data storage services described herein.

As illustrated in FIG. 5B, auto admin instance 485 may include one or more modules configured to provide visibility and control to system administrators (shown as 545), or to perform heat balancing (shown as 550), and/or anomaly control (shown as 555), resource allocation (shown as 560). Auto admin instance 485 may also include an admin console 565, through which system administrators may interact with the data storage service (and/or the underlying system). In some embodiments, admin console 565 may be the primary point of visibility and control for the data storage service (e.g., for configuration or reconfiguration by system administrators). For example, admin console 565 may be implemented as a relatively thin client that provides display and control functionally to system administrators and/or other privileged users, and through which system status indicators, metadata, and/or operating parameters may be observed and/or updated. In addition to these component-specific modules, auto admin instance 485 may also include components that are common to the different types of computing nodes that collectively implement Web services platform 130, such as a message bus (shown as 535) and/or a dynamic configuration module (shown as 540). In other embodiments, more, fewer, or different elements may be included in auto admin instance 485, or any of the elements illustrated as being included in auto admin instance 485 may be included in another component of Web services platform 130 or in a component configured to interact with Web services platform 130 to provide the data storage services described herein.

As illustrated in FIG. 5C, a node instance 595 may, for example, represent a storage node implementation of replica group 410 of FIG. 4. Node instance 595 may include one or more modules configured to provide partition management (shown as 570), to implement replication and failover processes (shown as 575), and/or to provide an application programming interface (API) to underlying storage (shown as 580). As illustrated in this example, each node instance 595 may include a storage engine 585, which may be configured to maintain (i.e. to store and manage) one or more tables (and associated table data) in storage 580 (which in some embodiments may be a non-relational database) on behalf of one or more clients/users. In addition to these component-specific modules, node instance 595 may include components that are common to the different types of computing nodes that collectively implement Web services platform 130, such as a message bus (shown as 535) and/or a dynamic configuration module (shown as 540). In other embodiments, more, fewer, or different elements may be included in node instance 595, or any of the elements illustrated as being included in node instance 595 may be included in another component of Web services platform 130 or in a component configured to interact with Web services platform 130 to provide the data storage services described herein.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

Various types may be employed in the data storage system to support the ordering of data in sorted indexes. In some embodiments, the data storage service may support only a small number of types (e.g., strings and decimal numbers), and all attribute values must have either a scalar or set (multiple value) type. For example, in some embodiments, the service (and/or the underlying system implementing the service) may only support two scalar data types: strings, and numbers (e.g., decimal numbers). In such embodiments, a date may be encoded as an integer (e.g., as a Unix epoch timestamp) rather than using a "date" data type. In other embodiments, more, fewer, or different data types may be supported. As noted above, in some embodiments, attribute names may always be of data type "string". In some embodiments, the service (and/or the underlying system) may support multi-valued types that are derived from the supported scalar types, as in the following example:

ScalarType:={N|S}
MultiValuedType:={NS|SS}

In this example, N represents a number, S represents a string, NS represents a set of numbers, and SS represents a set of strings. In various embodiments, attributes of type "string" may be part of a key or part of an index, and the maximum size of a string may be limited by the size of an index key (e.g., 1024 bytes cumulative for a range key or 2048 bytes for each hash key) or the item size (e.g., 64 K). In various embodiments, attributes of type "number" may be used to store exact-value decimal and integers, and may have variable width encoding. In some embodiments, the amount of space that can be occupied by an attribute of this type may be limited to a pre-determined amount. Note also that in various embodiments, a number can have a precision P (indicating the maximum number of significant digits that can be stored), and/or a scale S (indicating the number of digits from the decimal point to the least significant digit). The precision and scale of a number may in some cases be automatically inferred by the service, and an appropriate storage size may be used for the number. Negative numbers may be specified using a minus sign at the beginning of the number, but a plus sign specified before a number may not be stored, in some embodiments. Leading and/or trailing zeros may or may not be stored, in different embodiments. The following is an example of a number format that may be employed by the service (and underlying system) described herein:

Number_format=[+|−][{integer}][{.Integer}]

As noted above, an item may include one or more attributes. Each attribute may have two portions: an attribute name (e.g., an UTF8 string) and an attribute value (which may be expressed as a combination of a type and a value object, where the type describes the type of the value). In some embodiments, a single-valued attribute may have a name and a scalar value, and the type of the attribute may be encoded in the attribute value, as in the following examples:

{"my-string-attr": {"S": "my-string-value"}} # String type
{"my-number-attr": {"N": 123456.7}} # Number type In some embodiments, a multi-valued attribute may have a name, and one or more values of a specified type. In such embodiments, the values may be unique, as in the following examples:

{"Size":{"SS":["XL", "L", "M", "S"]} # String set
{"SingleDigitPrimes": {"NS": [2, 3, 5, 7]} # Number set In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. As described in more detail herein, in various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

As previously noted, in some embodiments there may be no pre-defined limit on the number of items in each table maintained by the data storage service. Conceptually, each item may be thought of as a mapping of attribute names to corresponding attribute values. Using this analogy, each entry in the map is an attribute. In various embodiments each item may include a key attribute, plus zero or more non-key attributes. In some embodiments, the key attributes must be single-valued attributes, while non-key attributes may be single-valued attributes or multi-valued attributes. The following is an example of an item that has five attributes: a PictureId (of type string), a CustomerId (of type number), a Title (of type string), and Tags (a multi-valued string attribute).

```
{
    "PictureId" : {"S" : "picture123"},
    "CustomerId" : {"N" : 1234567},
    "Title" : {"S" : "sun flower"},
    "Tags" : {"SS" : ["flower", "seattle"]}
}
```

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

Figure 6:
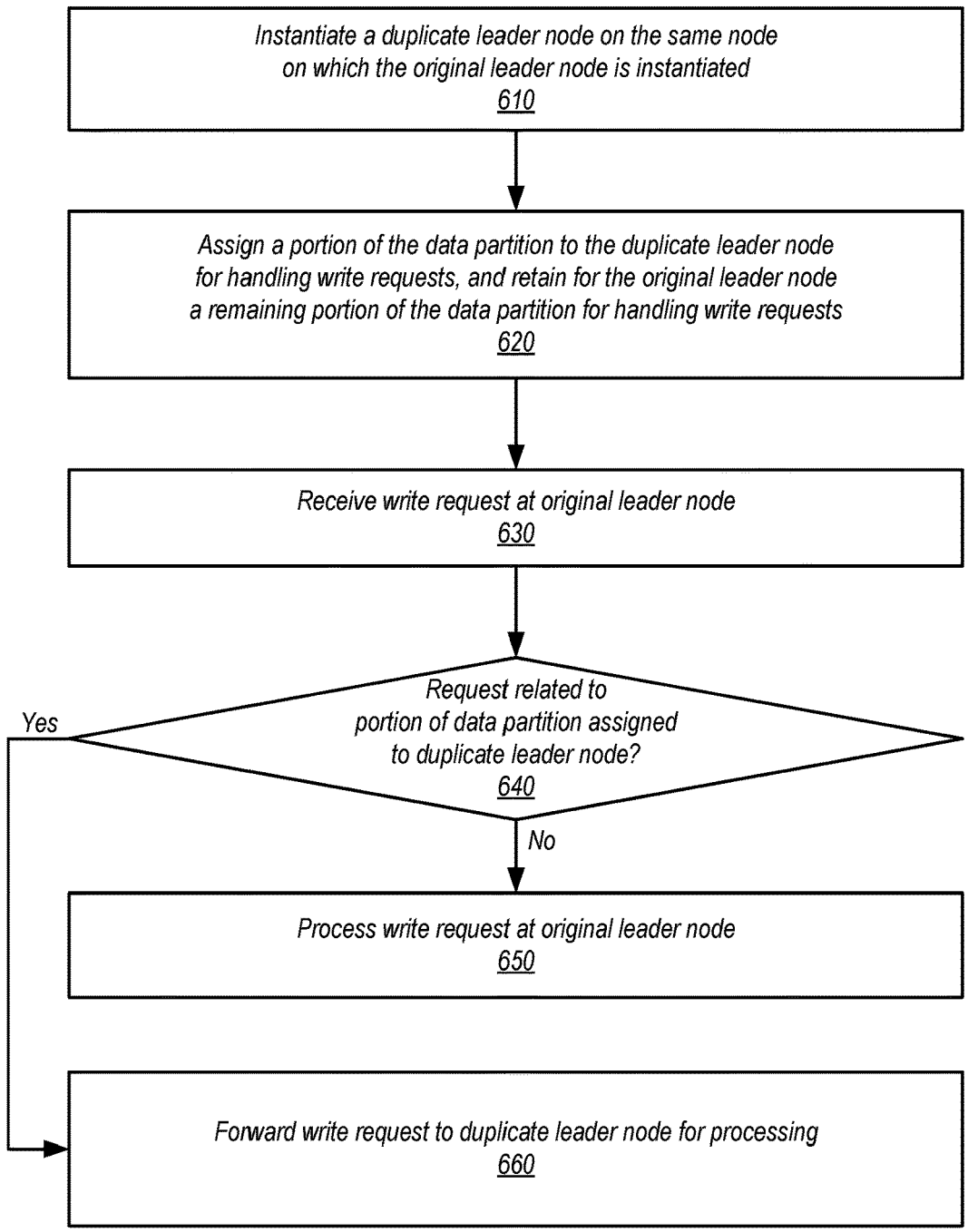
FIG. 6 is a flow diagram illustrating one embodiment of a method for pre-forking a leader replica according to some embodiments.

FIG. 6 is a flow diagram illustrating one embodiment of a method for pre-forking a leader replica according to some embodiments. At step 610 of process 600, a leader replica instantiates a duplicate replica on the same node on which the original leader is instantiated. For example, an existing leader replica of a replica group of a node—for example, replica group 110 of FIG. 1—creates a duplicate of itself on the same node. This duplication may be performed, for example, by the existing leader replica or by a control plane of the distributed data storage system, or another control module of a provider network such as a partition manager.

A leader replica may appoint or designate a leader of the duplicate host group. Various rules may be established for determining which duplicate host should be appointed leader of the duplicate host group, according to preferences or requirements of a specific embodiment system. For example, a static rule may be established such that the duplicate host that is a copy of the original leader replica may be appointed leader of the duplicate host group, when such a duplicate host exists. According to some embodiments, a control plane of a distributed data storage system or another control module, rather than the leader replica, may perform the appointment of a duplicate host group leader.

At step 620, a portion of the data partition is assigned to the duplicate leader node for handling write requests, while the original leader node retains a remaining portion of the data partition for handling write requests. For example, the leader replica may re-allocate a subset of its keyspace to be served by the duplicate host group. As discussed elsewhere herein, each leader replica may be associated with a keyspace, or set of database keys for which the leader or leader's host group is responsible for serving. After "pre-forking" before a partition by creating duplicate replica hosts on the same node (e.g. step 610), a subset of the leader replica's keyspace may be reallocated to be served by the duplicate host group. For example, the keyspace may be divided exactly in half according to some embodiments. In other embodiments, the keyspace may be divided proportionally according to how many hosts in each of the groups to be assigned to a portion of the keyspace, or by other logic as may be established by a system designer.

At step 630, the original leader replica receives a write request. At step 640, a determination is made whether the received write request is directed to a key or record within the portion of the data partition that has been assigned to the duplicate leader replica. If the received write request is within the portion of the data partition assigned to the duplicate leader replica, control passes to step 660.

If the received write request is not within the portion of the data partition assigned to the duplicate leader replica (i.e., it is within the portion of the data partition for which the original leader replica retained control), control passes to step 650. At step 650, the received write request is processed at the original replica node.

At step 660, the received read request is forwarded to the duplicate leader node for processing.

Figure 7:
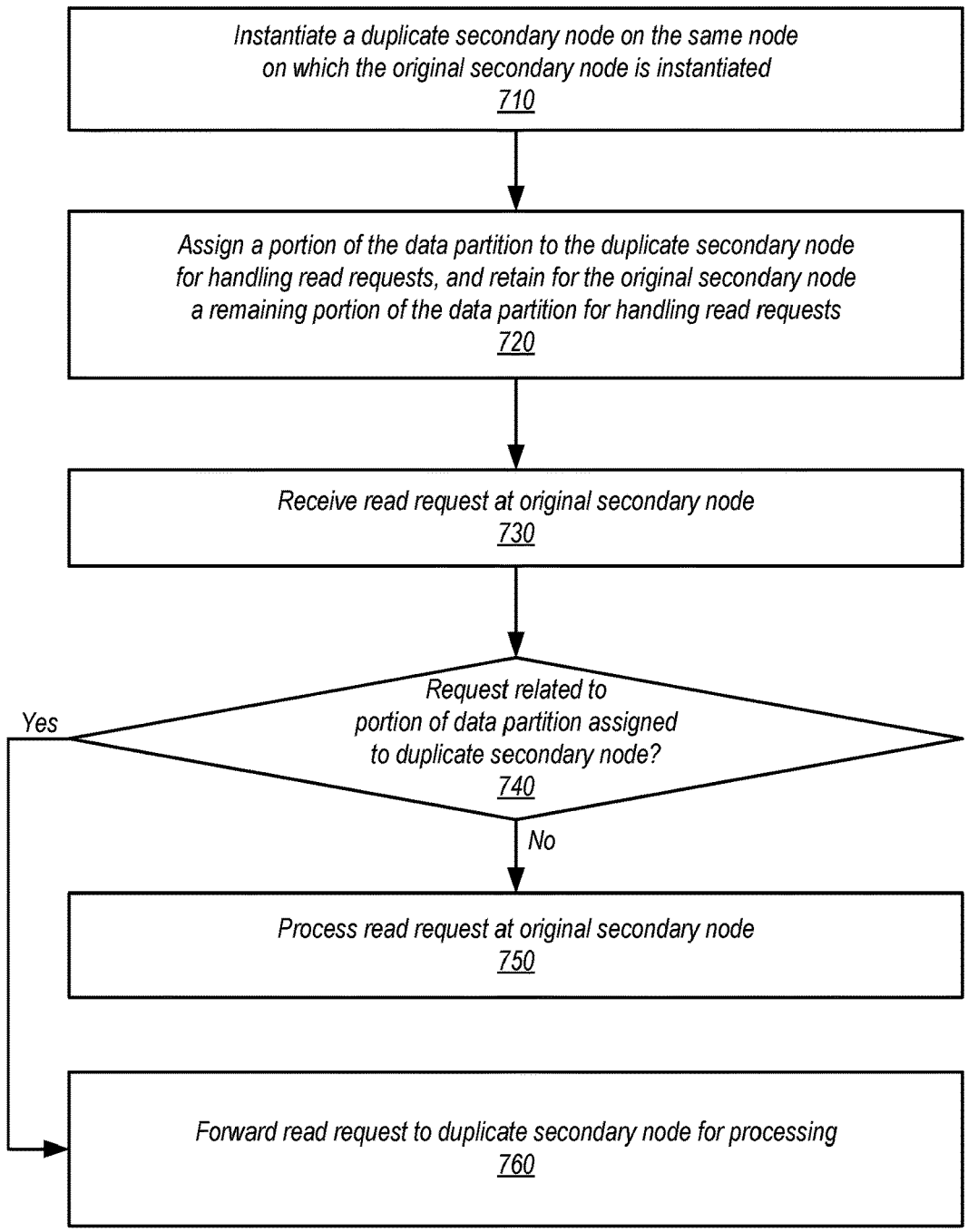
FIG. 7 is a flow diagram illustrating one embodiment of a method for pre-forking a secondary replica according to some embodiments.

FIG. 7 is a flow diagram illustrating one embodiment of a method for pre-forking a secondary replica according to some embodiments. At step 710 of process 600, a secondary replica instantiates a duplicate replica on the same node on which the original secondary replica is instantiated. For example, an existing secondary replica of a replica group of a node—for example, replica group 110 of FIG. 1—creates a duplicate of itself on the same node. This duplication may be performed, for example, by the existing secondary replica or by a control plane of the distributed data storage system, or another control module of a provider network such as a partition manager.

At step 720, a portion of the data partition is assigned to the duplicate secondary node for handling read requests, while the original secondary node retains a remaining portion of the data partition for handling read requests. For example, the secondary replica may re-allocate a subset of its keyspace to be served by the duplicate host group. As discussed elsewhere herein, each secondary replica may be associated with a keyspace, or set of database keys for which the secondary or secondary's host group is responsible for serving. After "pre-forking" before a partition by creating duplicate replica hosts on the same node (e.g. step 710), a subset of the secondary replica's keyspace may be reallocated to be served by the duplicate host group. For example, the keyspace may be divided exactly in half according to some embodiments. In other embodiments, the keyspace may be divided proportionally according to how many hosts in each of the groups to be assigned to a portion of the keyspace, or by other logic as may be established by a system designer.

At step 730, the original secondary replica receives a read request. At step 740, a determination is made whether the received read request is directed to a key or record within the portion of the data partition that has been assigned to the duplicate secondary replica. If the received read request is within the portion of the data partition assigned to the duplicate secondary replica, control passes to step 760.

If the received read request is not within the portion of the data partition assigned to the duplicate secondary replica (i.e., it is within the portion of the data partition for which the original secondary replica retained control), control passes to step 750. At step 750, the received read request is processed at the original replica node.

At step 760, the received read request is forwarded to the duplicate secondary node for processing.

Figure 8:
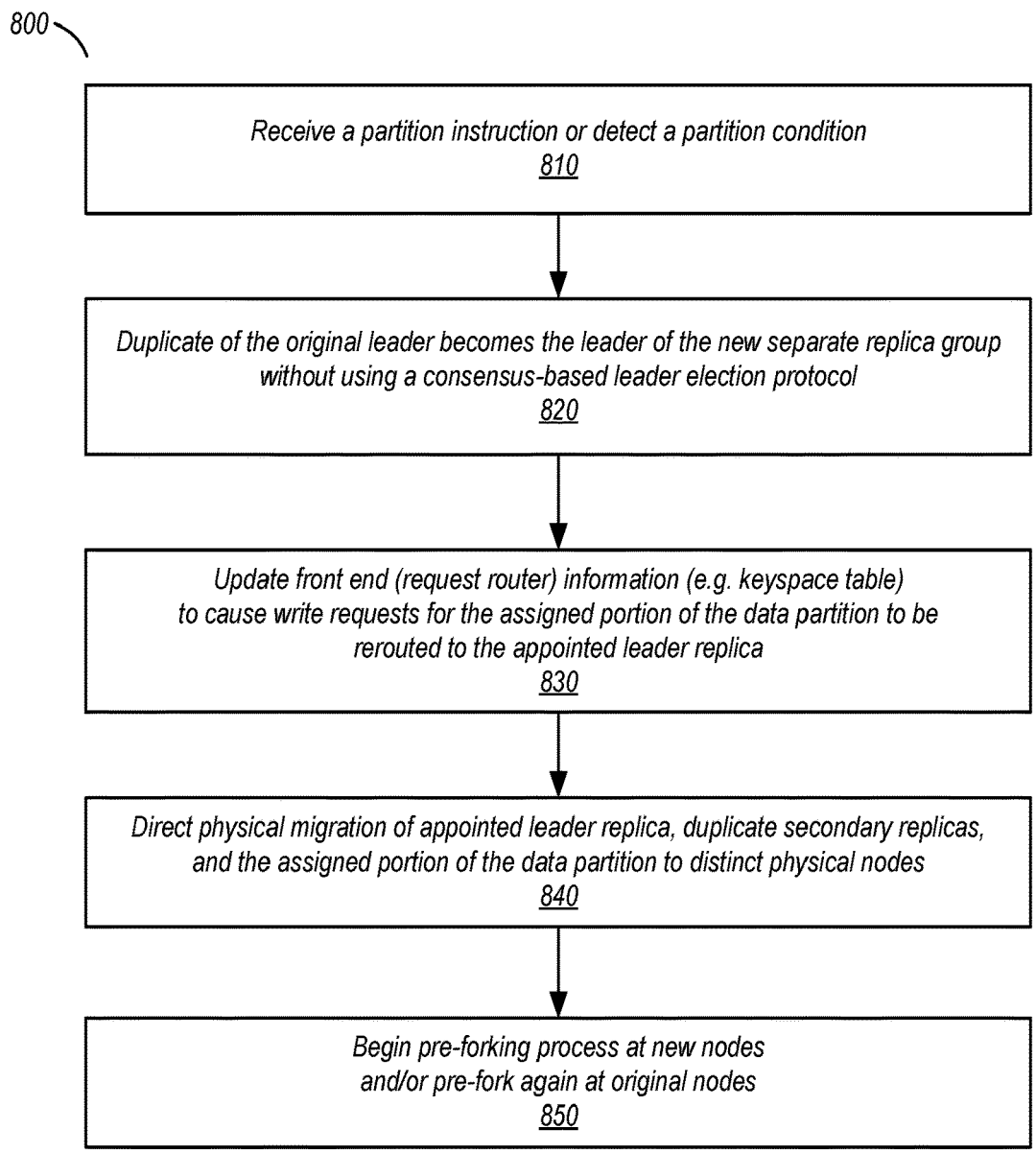
FIG. 8 is a flow diagram illustrating one embodiment of a method of partitioning a pre-forked replica group according to some embodiments.

FIG. 8 is a flow diagram illustrating one embodiment of a method of partitioning a pre-forked replica group according to some embodiments. At step 810 of process 800, a component such as a control plane or partition manager of a provider network or distributed data storage system receives an instruction to partition a replica group or detects a partition condition. For example, a system need or service-level requirement for additional storage, I/O, or computing capacity may necessitate a partition.

At step 820, a duplicate leader replica is appointed from among the duplicate replicas on the nodes of a pre-forked original replica group. Various system components may be configured in various systems appoint the new leader, for example the partition manager, the leader replica of the original replica group, or another node may appoint the new leader replica by a static rule, without using a consensus-based leader election procedure or other high-overhead method of selecting a leader. As an example, a static rule may dictate that a duplicate replica that resides on the same node as the original replica may automatically be appointed leader of a new replica group during partitioning.

At step 830, a partition manager may update front end or request router information (for example a keyspace table) at the system level in order to properly direct requests associated with the data partition assigned to the newly partitioned replica group. For example, a partition manager may initiate the partition split by causing write requests for the assigned portion of the data partition to be rerouted to the duplicate leader node. According to some embodiments, when a partition is to be formalized at the system level, a leader replica may update a global table of a distributed storage system to reflect the post-partition division of labor between the original replica group and the duplicate replica group. For example, the subset of keys assigned in step 620 to be served by the duplicate host group will be updated in a system-level keyspace table such that requests associated with that subset of keys may be properly routed to the duplicate leader replica by system-level controls and other resources.

At step 840, a partition manager directs migration of the duplicate leader node and its assigned portion of the data partition to a different node. For example, the duplicate host group may be relocated to a node separate from the original host group from which the duplicate host group was created. For example, existing functionality of distributed data storage systems may be employed to separate the host replicas to different nodes of the system. In some embodiment, the original host group may remain on its original node, or may be moved to a different node and the duplicate host group may remain on the original node or also be relocated.

At step 850, the new nodes of the new replica group and/or the nodes of the original replica group may begin pre-forking, for example using the methods of FIG. 6 and/or FIG. 7 described above. According to some embodiments, most or all replica nodes in a system may remain in a pre-forked state until such time as a partition is completed. In other embodiments, particular system requirements as determined by a system designer and managed by a system-level control component such as a control plane, admin instance, or partition manager may determine when pre-forking occurs on various replica nodes of a system.

Figure 9:
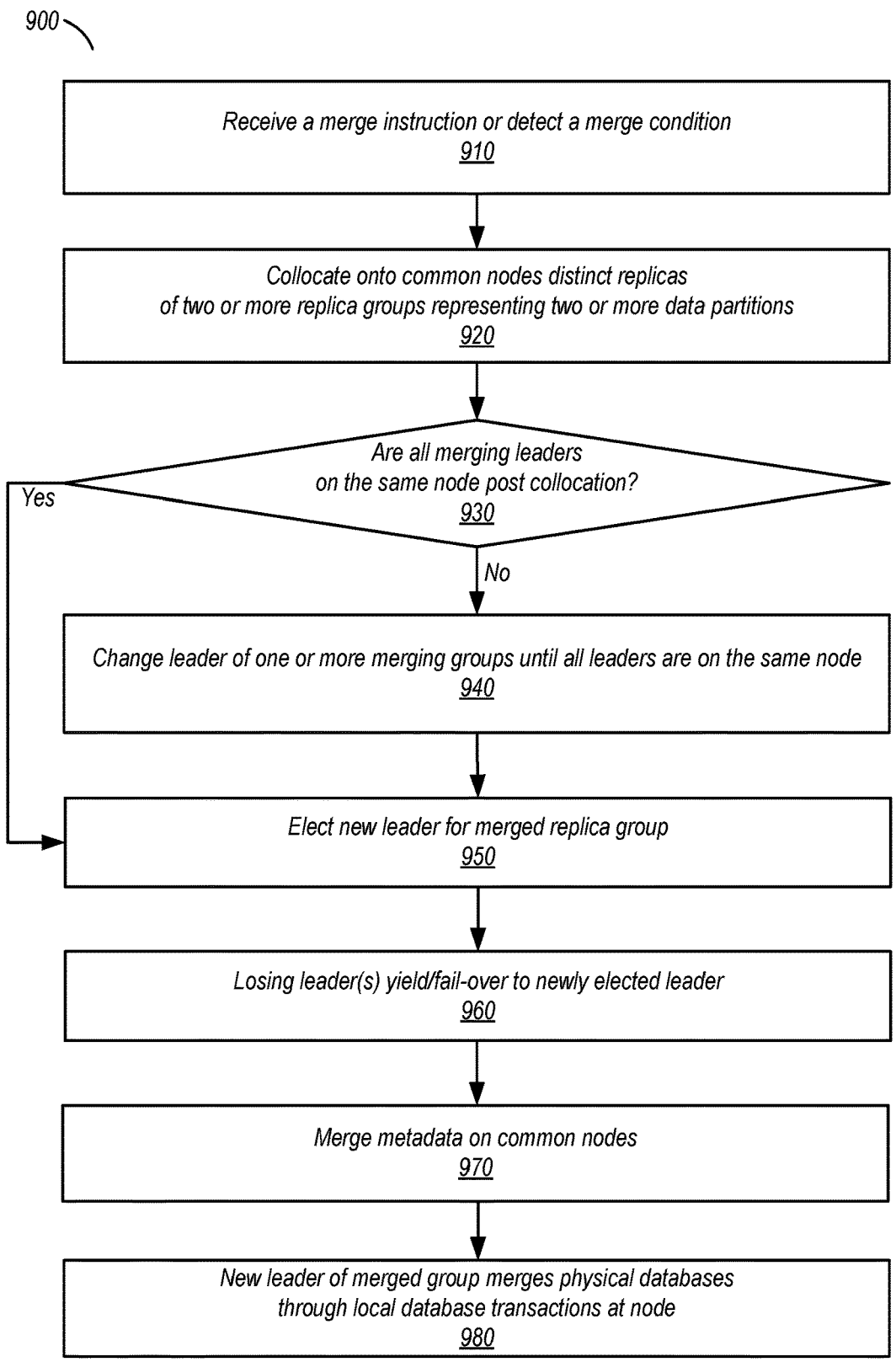
FIG. 9 is a flow diagram illustrating one embodiment of merging two partitions according to some embodiments.

FIG. 9 is a flow diagram illustrating one embodiment of merging two partitions according to some embodiments. At step 910 of process 900, a component such as a control plane or partition manager of a provider network or distributed data storage detects a node merge condition or receives an instruction to merge two or more nodes.

At step 920, replicas of two or more replica groups representing two or more data partitions are located to a set of common nodes (refer, for example, to the transition from phase A to phase B of FIG. 3 and associated descriptions). For example, a merging replica group may be copied or relocated from its home nodes to separate nodes onto which the merging host group is to be merged. According to some embodiments, a control plane, partition manager, or other control module of a provider network or distributed data storage system may perform the copy or relocation procedure using existing methods for relocating or duplicating host groups within a distributed storage system.

At step 930, a determination is made whether the leaders of all replica groups to be merged are located on the same node. If they are, control may pass to step 950 according to some embodiments. If leaders of the merging host groups are located on separate nodes after the collocation of step 920, control may pass to step 940.

At step 940, the leader of one or more merging replica groups may be changed in order to locate all replica group leaders on the same node. In some embodiments, one or more static rules for re-appointing leader replicas during partition merges may be used. For example, in the case where one or more merging replicas are copied onto an existing node that hosts an original leader node, any secondary replica to be merged with the original leader node must become the leader of the secondary replica's replica group during the merge process. In some embodiments, one or more consensus-based election procedures may be applied until all merging leader replicas reside on the same node.

At step 950, a leader of the post-merge host group is selected. According to some embodiments, a static rule may allow for efficient selection of a post-merge host group leader according to a design of a particular distributed data storage system. For example, according to some embodiments, a leader replica that resided, before merging, on the node that is to host the merged group may automatically be appointed the leader of the combined host group. For example, referring again to FIG. 3, leader replica 320 of replica group 310 would be appointed leader of the combined host group under such a rule, because leader replica 320 resided on replica group 310 pre-merge, and the group of leader replica 340, originally of replica group 350 was copied into replica group 310 to be merged. In other embodiments, various other static rules may be established for electing a new leader—for example, random selection between all hosts of the merged group or hosts that acted as leaders of their groups before merging. In still other embodiments, a consensus algorithm may be established and used to elect a new leader of the post-merge host group.

At step 960, according to some embodiments, the losing leader or leaders of step 950 yield to the newly elected leader by an established failover process, or otherwise becoming a secondary replica within the replica group of the newly elected leader replica.

At step 970, metadata may be merged between replicas residing on the same post-merge node. For example, the keyspace tables of all merged host groups may be merged into a single table associated with the newly merged replica group. According to some embodiments, write requests directed to all keys previously served by leaders that are merged during process 900 will be served by the elected or appointed post-merge leader. In some embodiments, a global keyspace table may be updated to reflect the newly combined keyspace of the merged node.

At step 980, the elected post-merge leader replica may merge physical databases. For example, the post-merge leader replica may use established local database transactions at the node level to "clean up" excess logical or physical resources. In some embodiments, one or more post-merge actions may be performed, alternatively or additionally, by a control plane or other system-level resources of a distributed data storage system or provider network.

Figure 10:
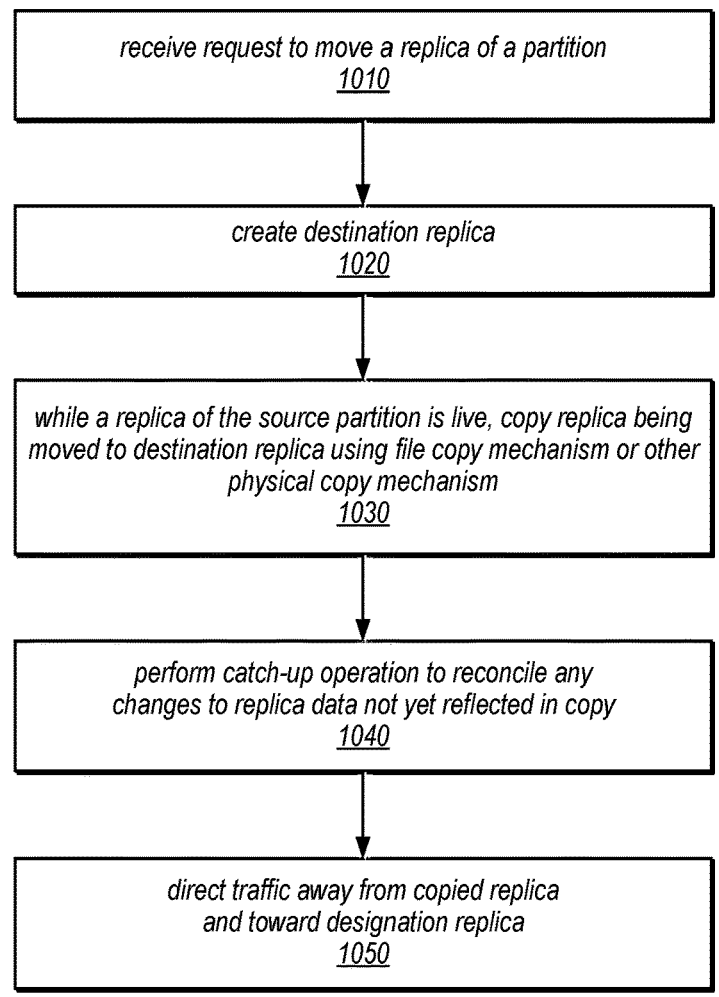
FIG. 10 is a flow diagram illustrating one embodiment of a method for moving a replica of a partition of a table being maintained by a data storage service on behalf of a storage service client while the partition is "live."

One embodiment of a method for moving (or copying) a replica of a partition of a table being maintained by a data storage service on behalf of a storage service client while the partition is "live" is illustrated by the flow diagram in FIG. 10. For example, process 1000 may implement step 920 for FIG. 9 or other methods as described herein. In this example, the method may include a component of the system that implements the data storage service receiving a request to move a replica of a partition, as in 1010 of process 1000. For example, the system may receive an explicit request to move a replica from a client/user or system administrator, or such a request may be automatically generated in the system in response to detecting an anomaly (as described in more detail below). As illustrated at 1020, in response to receiving the request to move the partition, the system may be configured to create a new replica (which may be referred to as a destination replica), while the partition is live (i.e. while one or more replicas of the partition continue to accept and service requests directed to the partition). In some embodiments, creating a destination replica may include selecting a computing node or storage device on which to create the destination replica, allocating memory on the computing node or storage device for the destination replica, creating or updating metadata associated with the partition and/or the destination replica, and/or performing other functions appropriate for creating the destination replica.

As illustrated in this example, the method may include the system copying the replica being moved to the destination replica using a file copy mechanism or another physical copy mechanism while a replica of the partition is live, as in 1030. In other words, the replica may be copied to the new destination replica using an operation that copies the physical locations of the replica data, rather than using a logical copying operation (e.g., one that reads and copies table data on a row-by-row basis). As illustrated at 1040, after performing the physical copying operation, the method may include the system performing a catch-up operation to reconcile any changes to the replica data that were made during the copy operation but that are not yet reflected in the new copy. This catch-up operation is described in more detail below. Once the destination replica has been created and populated, the method may include directing traffic away from copied replica and toward the new designation replica, as in 1050.

Figure 11:
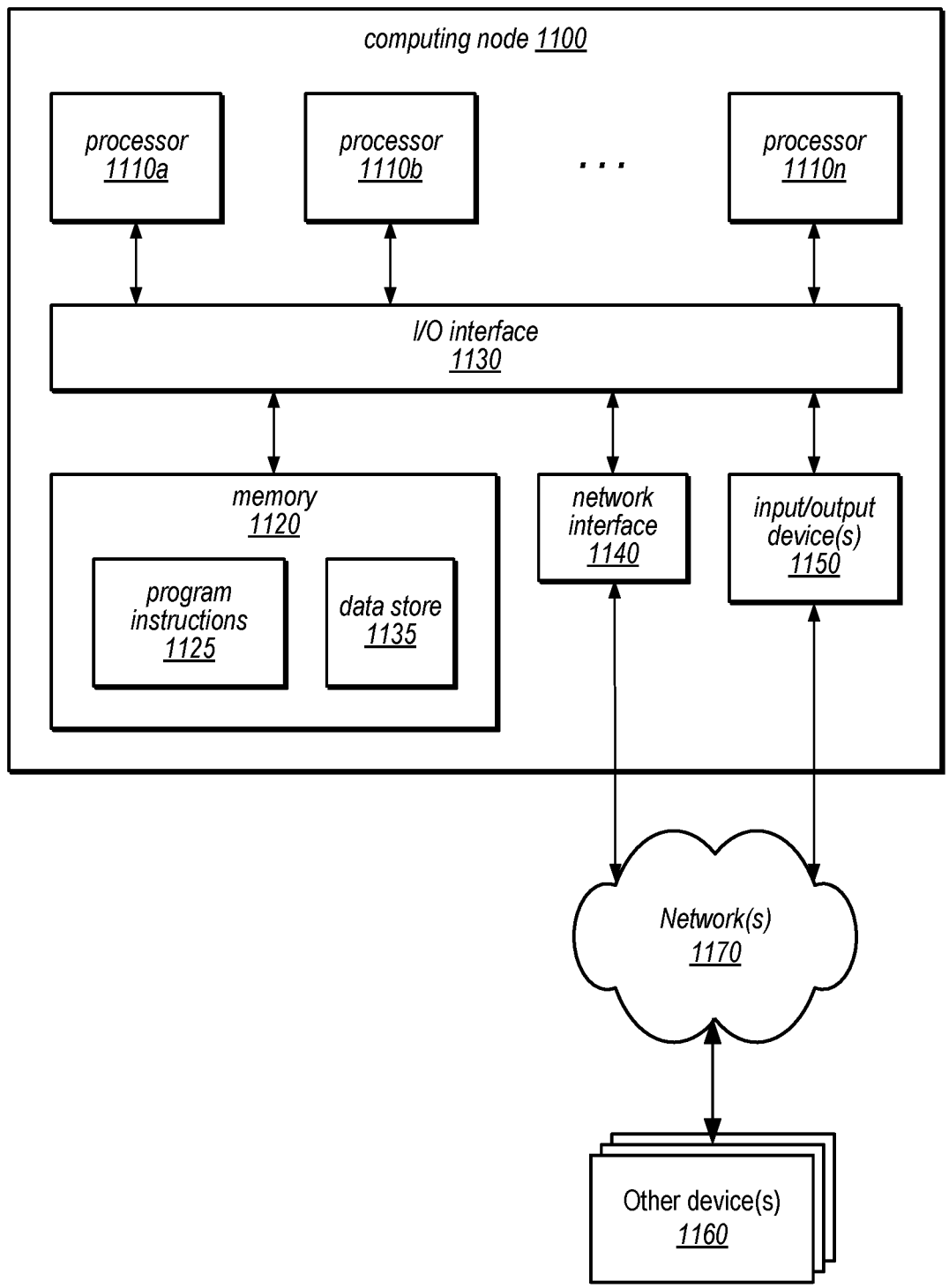
FIG. 11 is a block diagram illustrating an example computing system or node configured to implement at least some of the techniques described herein.

One computing node that implements some or all of the techniques described herein is illustrated by the block diagram in FIG. 11, according to at least some embodiments. Computing replica group 1100 may include functionality to provide any or all of the components of a system that implements a data storage service or another type of service that employs lease based leader election and/or leader failover protocols, or multiple computing nodes similar to or different from computing replica group 1100 may collectively provide this functionality, in different embodiments. For example, in various embodiments, one or more computing nodes 1100 may implement any number of nodes 110 as illustrated in FIG. 1, any number of storage devices, database instances, or node instances of a consistent data store or consistent data storage service, and/or any other components of other services, a provider network, or external resources that interact with a provider network for example as illustrated at FIG. 4.

Any number of these database instance or node instances of a consistent data store or consistent data storage service may each host one or more replicas of various data partitions and/or metadata associated therewith. For example, any given node instance may host a replica acting as leader replica for its replica group and/or a replica acting as a secondary replica in its replica group. In some embodiments that include multiple computing nodes 1100, all of the computing nodes 1100 may include the same or similar hardware components, software components, and functionality, while in other embodiments, the computing nodes 1100 comprising a computing system configured to implement the functionality described herein may include a wide variety of hardware components, software components, and functionality. In some embodiments, multiple computing nodes 1100 that collectively implement a provider network and/or other services may be components of a larger shared resource system or grid computing system.

In the illustrated embodiment, computing replica group 1100 includes one or more processors 1110 coupled to a system memory 1120 via an input/output (I/O) interface 1130. Computing replica group 1100 further includes a network interface 1140 coupled to I/O interface 1130, and one or more input/output devices 1150. As noted above, in some embodiments, a given node may implement the functionality of more than one component of a system that manages and maintains data in tables (e.g., in a non-relational database) on behalf of data storage service clients, such as that described herein. In various embodiments, a computing replica group 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as one that collectively implements a database service or consistent data storage service over multiple availability zones, each of the computing nodes may implement the same ISA, or individual computing nodes and/or replica groups of nodes may implement different ISAs.

In some embodiments, system memory 1120 may include a non-transitory, computer-readable storage medium that stores program instructions and/or data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as program instructions 1125 and data storage 1135, respectively.

Data storage 1135 may in various embodiments include collections of data maintained by a database service or consistent data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data and/or resource usage data, and/or timing parameter values for a leader failover protocol). In other embodiments, program instructions and/or data as described herein for implementing a database service and/or a consistent storage service that employ the techniques described above may be received, sent or stored upon different types of computer-readable media or on similar media separate from system memory 1120 or computing replica group 1100. Generally speaking, a computer-readable medium may include storage media or memory media such as magnetic or optical media, e.g., disk or CD/DVD-ROM coupled to computing replica group 1100 via I/O interface 1130. Program instructions and data stored on a computer-readable storage medium may be transmitted to a computing replica group 1100 for execution by a processor 1110a by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor(s) 1110, system memory 1120, and any peripheral devices in the computing node, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing replica group 1100 and other devices attached to a network (such as other computer systems, communication devices, input/output devices, or external storage devices), or between other nodes in a system providing shared computing services. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing replica group 1100 or may be distributed on various computing nodes of a system that is configured to implement the techniques described herein. In some embodiments, similar input/output devices may be separate from computing replica group 1100 and may interact with one or more computing nodes of a system through a wired or wireless connection, such as over network interface 1140.

Database service clients and/or consistent data storage service clients (e.g., users, subscribers and/or client applications) may interact with these services such as that described herein in various ways in different embodiments, such as to submit requests for service (including, but not limited to, requests to store, retrieve and/or update items in tables, or requests to repartition a table), and to receive results. For example, some subscribers to the service may have physical access to computing replica group 1100, and if so, may interact with various input/output devices 1150 to provide and/or receive information. Alternatively, other clients/users may use client computing systems to access the system, such as remotely via network interface 1140 (e.g., via the Internet and/or the World Wide Web). In addition, some or all of the computing nodes of a system providing the service may provide various feedback or other general types of information to clients/users (e.g., in response to user requests) via one or more input/output devices 1150.

Network interface 1140 may be configured to allow data to be exchanged between computing replica group 1100 and other devices 1160 attached to a network or networks 1170, such as other computer systems or devices as illustrated in FIG. 1 through FIG. 5, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing replica group 1100 may be transmitted to computing replica group 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that, in different embodiments, the techniques described herein may be applicable in systems that include a non-relational database or in which a non-relational data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of compute nodes, individually comprising at least one processor and a memory, implementing a distributed database, configured to:
collocate, on respective ones of the plurality compute nodes, individual replicas of a first replica group for a first database partition of the distributed database with respective replicas of a second replica group for a second database partition of the distributed database, as part of an operation to merge the first and second database partitions;
change a current leader replica of the first replica group or the second replica group to locate current leader replicas of the first and second replica groups on a same one of the plurality of compute nodes; and
service data requests to the first and second database partitions via the current leader replicas of the first and second replica groups collocated on the same compute node.

2. The system of claim 1, further configured to:
prior to the collocation, determine that resources used by the first or the second replica groups are expected to be surplus to future resource requirements of the first and second replica groups; and
responsive to the determination, generate a request to pre-merge the first and second replica groups to cause the operation to merge.

3. The system of claim 1, further configured to, as part of the operation to merge:
elect a new leader replica from the current leader replicas collocated on the same compute node; and
merge the first and second replica groups into a merged replica group, wherein the new replica acts as the merged replica group's leader replica.

4. The system of claim 3, further configured to:
subsequent to the operation to merge, service data requests to the merged replica group, wherein write requests to the merged replica group are serviced by the new leader replica.

5. The system of claim 3, wherein to merge the first and second replica groups into a merged replica group, the distributed database is configured to:
merge, on individual ones of the plurality of compute nodes, the individual replicas of the first replica group with respective replicas of the second replica group.

6. A method, comprising:
collocating, on respective ones of a plurality compute nodes, individual replicas of a first replica group for a first database partition with respective replicas of a second replica group for a second database partition as part of an operation to merge the first and second database partitions;
changing a current leader replica of the first replica group or the second replica group to locate current leader replicas of the first and second replica groups on a same one of the plurality of compute nodes; and
servicing data requests to the first and second database partitions via the current leader replicas of the first and second replica groups collocated on the same compute node.

7. The method of claim 6, further comprising:
prior to the collocating, determining that resources used by the first or the second replica groups are expected to be surplus to future resource requirements of the first and second replica groups; and responsive to the determination, generating a request to pre-merge the first and second replica groups to cause the operation to merge.

8. The method of claim 6, further comprising, as part of the operation to merge:
electing a new leader replica from the current leader replicas collocated on the same compute node; and
merging the first and second replica groups into a merged replica group, wherein the new replica acts as the merged replica group's leader replica.

9. The method of claim 8, further comprising:
subsequent to the operation to merge, servicing data requests to the merged replica group, wherein write requests to the merged replica group are serviced by the new leader replica.

10. The method as recited in claim 8, wherein electing the new leader replica is performed using a static rule that selects a current leader replica that resided on the same compute node prior to the operation to operation to merge.

11. The method of claim 8, further comprising:
subsequent to the election of the new leader replica, causing an unelected replica on the same compute node to fail over to the new leader replica via a leader failover process.

12. The method of claim 8, wherein merging the first and second replica groups into a merged replica group comprises:
merging, on individual ones of the plurality of compute nodes, the individual replicas of the first replica group with respective replicas of the second replica group.

13. The method of claim 12, wherein merging individual replicas of the first replica group with respective replicas of the second replica group comprises:
combining respective keyspace tables of a first replica of the first replica group and a second replica of the second replica group.

14. The method of claim 12, wherein merging an individual replica of the first replica group with a respective replica of the second replica group comprises:
copying data from a first replica of the first replica group to a second replica of the second replica group, wherein the copying is performed while first replica group continues to accept requests; and
performing a catch-up operation to reconcile one or more changes to the first replica that are not reflected in the second replica.

15. The method of claim 8, further comprising:
subsequent to the merging of the first and second replica groups, performing one or more local database transactions on one of the plurality of compute nodes to clean up excess logical or physical resources for the one compute node.

16. One or more non-transitory computer-accessible storage media storing program instructions that when executed on or across one or more processors cause the one or more processors to:
cause individual replicas of a first replica group for a first database partition to be collocated on respective ones of a plurality compute nodes with respective replicas of a second replica group for a second database partition as part of an operation to merge the first and second database partitions; and
cause a current leader replica of the first replica group or the second replica group to be changed to locate current leader replicas of the first and second replica groups on a same one of the plurality of compute nodes;
wherein, subsequent to the collocation and the change of the current leader replica, data requests to the first and second database partitions are serviced via the current leader replicas of the first and second replica groups collocated on the same compute node.

17. The non-transitory computer-accessible storage media of claim 16, wherein the program instructions when executed on or across the one or more processors cause the one or more processors to:
prior to the collocation, determine that resources used by the first or the second replica groups are expected to be surplus to future resource requirements of the first and second replica groups; and
responsive to the determination, generate a request to pre-merge the first and second replica groups to cause the operation to merge.

18. The non-transitory computer-accessible storage media of claim 16, wherein the program instructions when executed on or across the one or more processors cause the one or more processors to:
cause a new leader replica to be elected from the current leader replicas collocated on the same compute node; and
cause first and second replica groups to be merged into a merged replica group, wherein the new replica acts as the merged replica group's leader replica.

19. The non-transitory computer-accessible storage media of claim 18, wherein to merge the first and second replica groups into a merged replica group, the program instructions when executed on or across the one or more processors cause the one or more processors to:
cause the individual replicas of the first replica group on individual ones of the plurality of compute nodes to merge with respective replicas of the second replica group.

20. The non-transitory computer-accessible storage media of claim 18, wherein the program instructions when executed on or across the one or more processors cause the one or more processors to:
cause, subsequent to the merging of the first and second replica groups, one or more local database transactions to be performed on one of the plurality of compute nodes to clean up excess logical or physical resources for the one compute node.

* * * * *